United States Patent
Zuber et al.

[11] Patent Number: 6,156,449
[45] Date of Patent: Dec. 5, 2000

[54] CATALYST LAYER FOR POLYMER ELECTROLYTE FUEL CELLS

[75] Inventors: Ralf Zuber, Grossostheim; Ralf Karch, Kleinostheim; Knut Fehl, Schlüchtern-Ramholz; Karl-Anton Starz, Rodenbach, all of Germany

[73] Assignee: Degussa-Hüls Aktiengellschaft, Frankfurt am Main, Germany

[21] Appl. No.: 09/376,438

[22] Filed: Aug. 18, 1999

[30] Foreign Application Priority Data

Aug. 20, 1998 [DE] Germany ............ 198 37 669

[51] Int. Cl.⁷ .................................................. H01M 4/86
[52] U.S. Cl. ................ 429/42; 429/41; 429/44; 427/115; 427/126.1; 427/419.1; 502/101; 502/159; 252/500; 252/512; 252/521.5; 521/27; 106/31.64; 106/31.92
[58] Field of Search ............... 429/41, 42, 44; 252/500, 512, 521.5; 427/115, 126.1, 419.1; 502/101, 159; 521/27; 106/31.64, 31.92

[56] References Cited

U.S. PATENT DOCUMENTS

| | | |
|---|---|---|
| 4,876,115 | 10/1989 | Raistrick ............................ 427/115 |
| 5,084,144 | 1/1992 | Reddy et al. ....................... 429/42 |
| 5,234,777 | 8/1993 | Wilson ............................. 429/42 |
| 5,518,831 | 5/1996 | Tow et al. ........................ 429/42 |
| 5,677,074 | 10/1997 | Serpico et al. .................... 429/42 |
| 5,766,788 | 6/1998 | Inoue et al. ...................... 429/42 |
| 5,843,519 | 12/1998 | Tada ............................... 427/115 |
| 5,865,968 | 2/1999 | Denton et al. ..................... 429/42 |
| 6,007,934 | 12/1999 | Auer et al. ....................... 429/42 |

FOREIGN PATENT DOCUMENTS

| | | |
|---|---|---|
| 0718903A1 | 6/1996 | European Pat. Off. . |
| 4417403A1 | 11/1994 | Germany . |
| 19602629 | 8/1996 | Germany . |
| 19611510 | 9/1997 | Germany . |

*Primary Examiner*—Bruce F. Bell

[57] ABSTRACT

A catalyst layer on a substrate material which contains a proton-conducting polymer (ionomer), electrically conductive carbon particles and fine particles of at least one precious metal. The catalyst layer is obtainable by coating the substrate material with an ink which contains a dispersion of the carbon particles and at least one organic precious metal complex compound in a solution of the ionomer, and drying the coating below a temperature at which the ionomer or the substrate material is thermally damaged, the precious metals in the complex compounds being present with an oxidation number of 0 and the complex compounds being thermally decomposed during drying to form the fine precious metal particles.

26 Claims, 2 Drawing Sheets

CATALYST LAYER FOR POLYMER ELECTROLYTE FUEL CELLS

INTRODUCTION AND BACKGROUND

The present invention relates to a catalyst layer for fuel cells, especially PEM fuel cells, in which a solid polymer is used as the electrolyte.

Fuel cells convert a fuel with an oxidizing agent, physically separated from one another, into electricity, heat and water at two electrodes. Hydrogen or a hydrogen-rich gas can be used as the fuel and oxygen or air as the oxidizing agent. The energy conversion process in the fuel cell is distinguished by particularly high efficiency. For this reason, fuel cells in combination with electric motors are gaining increasing importance as an alternative to conventional combustion engines.

The so-called polymer electrolyte fuel cell (PEM fuel cell) is suitable for use as an energy converter in motor vehicles thanks to its compact construction, its power density and its high efficiency.

The PEM fuel cell consists of a stacked arrangement of membrane electrode assemblies (MEAs), between which bipolar plates are arranged for the supply of gas and current conduction. A membrane electrode assembly consists of a polymer electrolyte membrane which is provided on both sides with catalyst layers. One of the catalyst layers acts as an anode for the oxidation of hydrogen and the second catalyst layer as a cathode for the reduction of oxygen. So-called gas diffusion structures made of carbon fiber paper or nonwoven carbon fabric, which, as a result of their high porosity of up to 75%, allow the reaction gases good access to the catalyst layers and permit good discharge of the cell current, are placed on the catalyst layers.

The two catalyst layers in a membrane electrode assembly, i.e. anode and cathode, contain so-called electrocatalysts which catalytically support the respective reaction (oxidation of hydrogen or reduction of oxygen). The metals of the platinum group of The Periodic Table of Elements are preferably used as catalytically active components. For the most part, so-called support catalysts are used, in which the catalytically active platinum group metals are applied in a highly disperse form on to the surface of a conductive support material. The average crystallite size of the precious metal particles is approximately between 1 and 10 nm. Fine particle size carbon blacks have proved suitable as support materials. Depending on the area of application, anode and cathode layers can be constructed in the same way or can contain different electrocatalysts.

The polymer electrolyte membrane in a PEM fuel cell consists of proton-conducting polymer materials. These materials are also referred to below as ionomers for short. A tetrafluoroethylene-fluorovinyl ether copolymer with acid functions, especially sulfonic acid groups, is preferably used. A material of this type is marketed for example by E. I. du Pont with the trade name NAFION®. However, other, especially fluorine-free, ionomer materials such as sulfonated polyether ketones or aryl ketones or polybenzimidazoles may also be used.

For the widespread commercial use of PEM fuel cells in motor vehicles, further improvement in the electrochemical cell performance and a marked reduction in the system costs, which are largely caused by the platinum group metals required, is necessary. To reduce the costs per kilowatt of installed capacity, the loading of the electrodes in a fuel cell with the platinum group metals must be reduced. To this end, the electrocatalysts or the catalyst layers must be further improved and the catalytically active precious metal particles must be utilized more effectively.

Essential for the effectiveness of a catalyst layer is the formation of the so-called three-phase zones, in which the catalytically active precious metal particles fixed on the support, the polymer electrolyte and the reaction gas are in direct contact.

U.S. Pat. No. 4,876,115 describes a process for treating a porous gas diffusion electrode which has a catalyst load with platinum applied on to carbon particles of less than 0.5 mg $Pt/cm^2$. The electrode is impregnated with a solution of an ionomer. As a result, the surfaces of the carbon particles are coated with the ionomer.

In U.S. Pat. No. 5,234,777 a membrane electrode assembly consisting of a polymer electrolyte membrane and catalyst layers and porous gas diffusion structures on both sides is proposed. The catalyst layers consist of a platinum catalyst (platinum on a carbon support) and a proton-conducting ionomer. The thickness of the catalyst layers is less than 10 $\mu$m. The platinum catalyst is evenly dispersed in the proton-conducting ionomer. The platinum load of the catalyst layers is less than 0.35 $mg/cm^2$.

To produce the membrane electrode assembly according to this patent specification, two processes are described (protocol I and protocol II). According to protocol I, the platinum catalyst is dispersed in an alcoholic solution of the ionomer. This dispersion, generally also referred to as ink, is applied on to a support film of PTFE (polytetrafluoroethylene), dried and laminated on to the opposite sides of the polymer electrolyte membrane by heat pressing. According to protocol II the polymer electrolyte membrane is directly coated with an ink consisting of platinum catalyst and ionomer solution. The applied coat is dried at a minimum of 150° C.

The electrode layers according to U.S. Pat. No. 5,234,777 are distinguished by a homogeneous distribution of the catalyst in the ionomer. A deliberate construction of three-phase zones, and thus a better utilization of the catalyst used, is not possible by this process.

U.S. Pat. No. 5,084,144 describes the production of a gas diffusion electrode with an increased number of three-phase zones and thus improved electrocatalytic activity. To produce the gas diffusion electrode, an arrangement consisting of a layer of an electrically conductive support material on a hydrophobic gas diffusion structure is taken as the starting point. The layer is impregnated with a solution of an ionomer and then introduced into an electrolytic bath with precious metal ions, which are then deposited by short pulses of current in the form of crystallites with diameters of less than 10 nanometers. According to this patent specification, the catalytically active precious metal particles are therefore introduced into the catalyst layer by a subsequent electrochemical process.

The disadvantage of this process is that, although contact of the platinum catalyst with the ionomer is guaranteed, the access of the reactive gases is not sufficiently taken into account. This leads to gas transport problems, particularly with high current densities.

The contact of the electrocatalyst with the system of pores in the catalyst layer for reactive gases can allegedly be deliberately improved by a process according to German application DE 19502622 A1. According to this process, an inorganic compound of a precious metal is crystallized out in the system of pores of an uncatalyzed gas diffusion electrode and then reduced under an electrolyte while a gas is being fed in. The uncatalyzed gas diffusion electrode consists, for example, of a layer of activated carbon bonded with PTFE. According to this process too, the catalytically active precious metal particles are introduced into the catalyst layer in a separate process step. The process requires a final reduction of the precious metal compounds.

The process according to DE 19502622 A1 was developed for gas diffusion electrodes in fuel cells with liquid electrolytes. The process is not suitable for polymer electrolyte fuel cells, since a solid, and thus stationary, polymer electrolyte is present in this case, which cannot be used for the deliberate formation of the three-phase zones in accordance with the above process.

Another process for the production of a gas diffusion electrode is described in DE 4417403 A1. According to this document, a flat base material for a gas diffusion electrode is first formed from a mixture of a carbon powder and a fluorinated resin powder and calcined at 350° C. One side of the flat base material is coated with a solution of a platinum group metal salt in a complexing organic solvent and dried. This formed material is then calcined again at 250–380° C. in a protective gas atmosphere.

The process according to DE 4417403 A1 also has a separate process step for the introduction of the precious metal particles into the catalyst layer. Because calcination has to be carried out twice, it is very time-consuming and expensive. No real increase in the proportion of three-phase zones is achieved, since the process cannot be carried out in the presence of ionomer, since this would be thermally damaged during the calcination. Only after the last calcination is the electrode placed on a polymer membrane coated with a NAFION® liquid and heat-pressed with this at 130° C.

A general disadvantage of the known membrane electrode assemblies and of the processes for the production thereof or for the production of gas diffusion electrodes is that the electrocatalyst (generally a precious metal on a carbon support) either has to be prepared from a precious metal compound and a support material in a previous production process or has to be introduced into the catalyst coating afterwards. These additional steps increase the costs of a PEM fuel cell system.

An object of the present invention was therefore to provide a catalyst layer for polymer electrolyte fuel cells which exhibits better electrocatalytic activity than known catalyst layers and can be produced in a simple and inexpensive process. Another object of the invention is to enable the preparation of an ink for the production of the catalyst layer and the production process itself, and the gas diffusion electrodes and membrane electrode assemblies produced thereby.

SUMMARY OF THE INVENTION

The above and other objects can be achieved by a catalyst layer on a substrate material which contains a proton-conducting polymer (ionomer), electrically conductive carbon particles and fine particles of at least one precious metal.

The catalyst layer is obtainable by coating the substrate material with an ink, which contains a dispersion of the carbon particles and at least one organic precious metal complex compound in a solution of the ionomer, and drying the coating below a temperature at which the ionomer or the substrate material are thermally damaged, the precious metals in the complex compounds being present with an oxidation number of 0 and the complex compounds being thermally decomposed during drying to form the finely divided precious metal particles.

BRIEF DESCRIPTION OF DRAWINGS

The present invention is explained in more detail by means of the accompanying FIGS. 1 to 5, wherein.

DETAILED DESCRIPTION OF INVENTION

Figure 1:
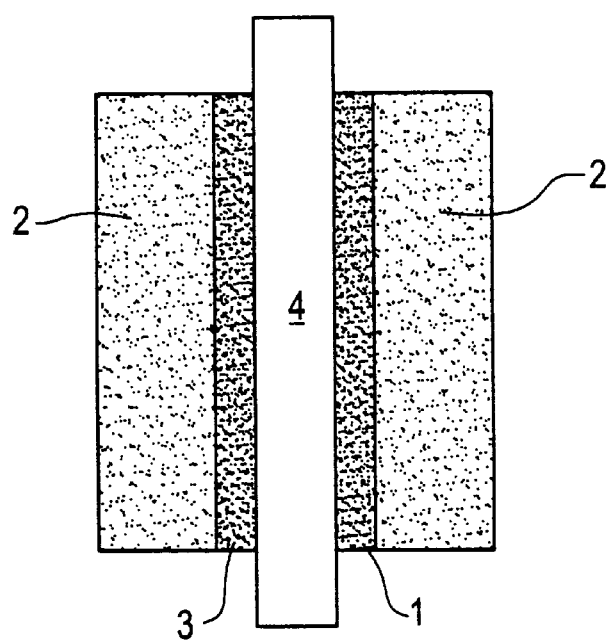
FIG. 1 is a schematic cross-sectional view illustrating the structure of a membrane electrode assembly of the invention.
Figure 2:
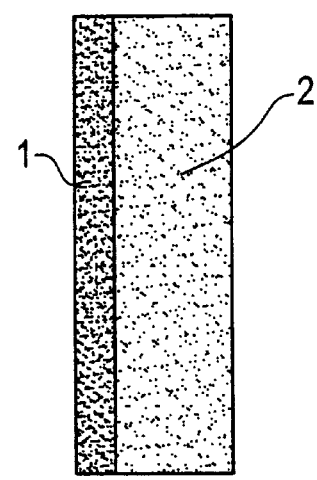
FIG. 2 is a schematic cross-sectional view illustrating the structure of a gas diffusion electrode of the invention.
Figure 3:
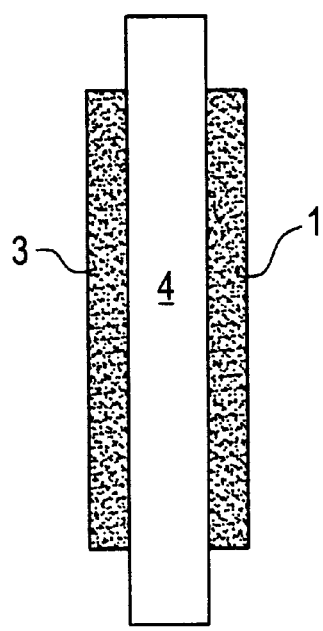
FIG. 3 is a schematic cross-sectional view of a polymer membrane with catalyst layers on both sides (membrane catalyst assembly), according to the invention.

FIGS. 1, 2 and 3 serve to clarify the terms used in this invention. FIG. 1 shows the structure of a membrane electrode assembly of the polymer membrane 4 with gas diffusion electrodes applied on both sides, each of which consists of the catalyst layer 1 or 3 and a gas diffusion layer 2.

The structure of a gas diffusion electrode is shown in FIG. 2. A gas diffusion electrode consists of a porous gas diffuser layer 2, also referred to as a gas diffusion structure, and a catalyst layer 1 applied on one side.

FIG. 3 shows a polymer membrane 4 with catalyst layers 1 and 3 applied on both sides. An arrangement of this type is referred to below as a membrane catalyst assembly.

The catalyst layer according to the invention substantially consists of the ionomer, the conductive carbon particles, the precious metal particles and the system of pores of the layer which is established when the layer is produced.

The electrocatalytic activity of this layer exhibits a leap in performance compared with the known catalyst layers. Compared with conventional catalyst layers, for the production of which finished support catalysts (precious metal particles on, for example, carbon black) are used, the catalyst layers according to the invention display equivalent catalytic activity with only about 50% of the catalyst load. With the same precious metal load the layers according to the invention supply correspondingly increased electrical power.

The increase in power observed cannot be explained by an optimized structure of known catalyst layers, but provides evidence that the catalyst layers according to the invention exhibit a novel structure which originates from the production process used. The production process to be described below obviously brings about a very advantageous arrangement of ionomer, carbon particles, precious metal particles and pores in the catalyst layer in relation to one another, thus permitting better utilization of the catalytic activity of the precious metal particles.

Essential for the production of the gas diffusion electrodes according to the invention is the use of a novel ink. It contains a dispersion of the conductive carbon particles and at least one organic precious metal complex compound in a solution of the ionomer, the precious metals in the complex compounds being present with an oxidation number of 0 and the complex compounds being capable of thermal decomposition to form fine precious metal particles below a temperature at which thermal damage to the ionomer or the substrate material sets in.

Compared with the known production processes, the ink contains no prefabricated support catalyst but has all the precursors necessary for the layer (solution of the ionomer, precious metal complex compounds and conductive carbon particles), so that the catalyst layer can be produced in one operation. Subsequent introduction of the catalytically active precious metals is not necessary.

The platinum group metals platinum, palladium, iridium, rhodium and ruthenium or alloys thereof are used as the catalytically active components. The catalytically active metals or metal alloys may contain other alloying additions such as cobalt, chromium, tungsten, molybdenum, vanadium, iron, copper, nickel etc.

The platinum group metals to be used depend on the planned field of application of the finished PEM fuel cell. If the fuel cell is operated with pure hydrogen as fuel, it is sufficient if only platinum is used as the catalytically active precious metal. The ink required for the production of the catalyst layer contains only one organic complex compound of platinum in this case. This catalyst layer may be used both for the anode and for the cathode.

If, on the other hand, a reformate gas containing carbon monoxide is used as fuel, the anode catalyst should possess the highest possible resistance to carbon monoxide poisoning. Bimetallic electrocatalysts based on platinum/ruthenium are suitable for this purpose. To produce the anode layer, the ink must therefore contain both metals in the form of organic complex compounds. In this case, it is sufficient if the cathode layer still contains only platinum as the catalytically active precious metal.

In addition, bimetallic alloy catalysts of platinum with transition metals such as, for example, cobalt and chromium have become known. There are also ternary alloy catalyst for applications in fuel cells. An example of these is a platinum/cobalt/chromium catalyst. To produce these catalysts, the required metals must be added to the ink in the form of organic complex compounds.

The catalytically active components are added to the ink in the form of organic precious metal complex compounds in which the precious metals are present with an oxidation number of 0. These precious metal compounds must fulfil the above mentioned conditions in respect of their thermal decomposition properties. Preferred materials in this class of compounds are complex compounds between platinum with an oxidation number of 0 and vinyl-substituted siloxanes. These compounds can be manufactured as disclosed in the U.S. Pat. No. 3,775,452. They are frequently called Karsted-catalysts according to their inventor.

The reaction product of 1,3-divinyl-1,1,3,3-tetramethyldisiloxane with hexachloroplatinic acid is particularly preferred. The liquid reaction product contain approximately 18 wt.-% of platinum and will be called Pt-VTS in the following. Pt-VTS can be decomposed e.g. by drying at a temperature of 110° C. Extremely finely divided, metallic platinum remains. The silicon content of the vinyl-substituted siloxanes can no longer be detected in the finished catalyst layers.

Suitable complex compounds of the precious metals iridium, ruthenium and palladium are dodecacarbonyltetrairidium ($Ir_4(CO)_{12}$), ($\eta^6$-benzene)($\eta^4$-cyclohexadiene) ruthenium(0) (($\eta^6$-$C_6H_6$)Ru($\eta^4$-1,3-$C_6H_8$)) and bis(dibenzylideneacetone)-palladium(0).

Depending on the state of aggregation and the desired concentration, the organic precious metal complex compound may be used as a pure liquid or as a solution in a mostly non-polar solvent. Examples of these are aliphatic hydrocarbons or esters.

When screen printing techniques are used to produce the electrode coating, the evaporation numbers (EN) of these solvents should be greater than 600, preferably greater than 800. The evaporation number is determined in accordance with DIN 53170. It is a relative value. Diethyl ether is used as the reference value.

As ionomers for the ink, the materials of the proton-conducting membranes described above are typically used, but in dissolved form. Preferred ionomers are tetrafluorothylene-fluorovinyl ether copolymers with acid functions, specially with sulfonic acid groups. Fluorine-free ionomer materials, such as sulfonated polyether ketones or aryl ketones or polybenzimidazoles are also suitable.

Mono- and polyhydric alcohols, glycols and glycol ether alcohols and glycol ethers are suitable as solvents for the ionomer. Their evaporation number should also be greater than 600, preferably greater than 800. Examples of suitable solvents are propylene glycol, dipropylene glycol, glycerol, hexylene glycol and others.

Any carbon materials with high electrical conductivity and high surface area known in the area of fuel cells may be used as a material for the conductive carbon particles. Carbon blacks, graphite or activated carbons are preferably used.

The weight ratio of the conductive carbon particles to the ionomer in the ink is typically between 5:1 and 1:1, preferably between 4:1 and 2:1. The desired precious metal load (area concentration in $mg/cm^2$) of the finished catalyst layer can be adjusted by means of a corresponding weight ratio of the precious metals to the carbon particles in the ink, with a given layer thickness. Weight ratios of the precious metals to the carbon particles of between 1:10 and 4:1 are preferably used.

To produce a homogeneously dispersed ink, known auxiliaries may be used such as, for example, high-speed stirrers, ultrasound baths or three-roll mills.

The homogenized ink may be applied on to the substrate material by means of various techniques. These include, for example, spraying, brushing, spreading or printing.

After coating the substrate material with the ink, or dispersion, the coating obtained is dried at an elevated temperature. Ionomer, precious metal complex compounds and the drying temperature must be appropriately selected to achieve optimum results after drying. The precious metal complex compounds should be capable of decomposition at a drying temperature which is still below a temperature at which the ionomer and optionally the substrate material are thermally damaged. As a result of the thermal decomposition of the complex compounds, extremely finely divided precious metal particles are produced in the layer, which require no subsequent reduction. These precious metal particles form the catalytically active components of the gas diffusion electrode. They are therefore formed only when the electrode coating is dried. A separate, costly production of an electrocatalyst, prior to the electrode production, is thus avoided by the invention, as is a subsequent introduction of the catalytically active precious metals and a final reduction.

Thermal damage to the ionomer can consist in degradation of the proton-conducting functional groups, such as e.g. —$SO_3H$. In addition, irreversible changes to the structure of the polymer are possible which have a disadvantageous effect on the mechanical properties or the proton conductivity of the polymer. For tetrafluoroethylene-fluorovinyl ether copolymers with acid functions, e.g. NAFION® by Du Pont de Nemours, the suitable drying temperatures are between 60 and 200° C., preferably between 70 and 160° C.

To achieve optimum electrocatalytic activities, the layer thicknesses of the electrode layers should be between 1 and 100, preferably between 5 and 100 μm. Below a thickness of 1 μm the layer becomes irregular owing to its porous structure. This results in reduced electrical conductivity. Above 100 μm the electrochemical effectiveness of the catalyst particles contained in the layer is markedly reduced. For the most common applications, layer thicknesses of between 5 and 50 μm have proved particularly suitable.

Depending on the layer thickness of the electrode, area concentrations of metal in the catalyst layers of between 0.01 and 5 mg metal/$cm^2$ are possible. According to the layer thickness, weight ratios of the precious metals to the carbon particles of 1:10 to 4:1 are necessary.

As shown by FIGS. 1 to 3, the catalyst layers according to the invention may be used to produce various components of fuel cell systems which can be marketed separately. FIG. 2, for example, shows a gas diffusion electrode, which is obtained when a gas diffusion structure is used as substrate material for the catalyst layer. This may be carbon fiber paper or nonwoven carbon fabric, for example.

FIG. 3 is a representation of a membrane catalyst assembly. It is obtained by coating each side of the polymer electrolyte membrane with a catalyst layer, at least one layer of which is a catalyst layer according to the invention. The two layers may contain different catalytically active precious metals. By applying gas diffusion structures to both sides, a polymer electrolyte membrane may be produced therefrom.

Instead of the individual components, however, there is also the possibility of making complete membrane electrode assemblies according to FIG. 1. For this purpose, the catalyst layers may be applied directly on to the polymer electrolyte membrane and then provided with the gas diffusion structures. Alternatively, the gas diffusion electrodes described above may be produced separately and then applied on to both surfaces of the polymer electrolyte membrane.

The following examples 1–2 describe the production of catalyst layers according to the invention and membrane electrode assemblies for fuel cells made therefrom, while comparative example VB1 shows the production of a membrane electrode assembly according to U.S. Pat. No. 5,234,777, protocol II. All membrane electrode assemblies were tested in a PEM fuel cell with an electrode area of 25 $cm^2$ in unpressurized hydrogen/air operation (1 bar/1 bar). Water repellent carbon fiber paper, type TGP-H-090 by ETEK Inc., Natick(USA), was used as the material for gas diffusion.

Proton-conducting polymers may be present in an acidic, proton-conducting $H^+$ form or, after exchanging the protons for monovalent ions, such as e.g. $Na^+$ and $K^+$, in a non-acidic $Na^+$ or $K^+$ form. The non-acidic form of the polymers is usually more resistant to temperature loading than their acidic form.

In the following examples, therefore, the proton-conducting membranes and the ionomer in the catalyst layers were used in their $Na^+$ form. In the last process step of the production, the ionomers were converted back into the acidic, proton-conducting form by so-called reprotonation. The reprotonation took place by treating the membrane electrode assemblies in sulfuric acid.

COMPARATIVE EXAMPLE 1

VB1

Based on protocol II of U.S. Pat. No. 5,234,777 an MEA was produced as follows: a dispersion of 1 g support catalyst (Degussa, 20% Pt on Vulcan XC72), 10 g of a 5% NAFION® Solution in low-boiling alcohols (Aldrich, Karlsruhe), 3.3 g glycerol, 8.2 g water and 0.47 g 1 N NaOH solution was prepared. The mixture was dispersed in an ultrasound bath. A NAFION® 115 membrane in the $Na^+$ form was attached to a heated plate. The mixture was applied onto one side of the membrane and dried at 150° C. This procedure was repeated until the desired platinum load of 0.25 mg Pt/$cm^2$ was reached. The reverse side of the membrane was then coated in the same way. Before being used in the PEM fuel cell, the membrane coated with catalyst was reprotonated in 0.5 M sulfuric acid solution. The total platinum load (sum of the two catalyst layers) of the membrane electrode assembly was 0.5 mg/$cm^2$.

EXAMPLE 1

To produce a membrane electrode assembly, the following inks were produced:

The production of the reaction product Pt-VTS took place on the basis of U.S. patent specifications U.S. Pat. No. 3,775,452 and U.S. Pat. No. 3,715,334. 20 parts by weight sodium carbonate were added to a mixture of 10 parts by weight $H_2PtCl_6.8H_2O$ and 20 parts by weight 1,3-divinyl-1,1,3,3-tetramethyldisiloxane and 50 parts by weight ethanol. The mixture was boiled for 30 minutes under reflux, stirring, left to stand for 15 hours and then filtered. The volatile components of the mixture were distilled off under vacuum. The residue was dissolved in benzene, filtered again and the benzene was then distilled off under vacuum. The platinum content of the liquid residue was 18.1 wt. %.

To produce an ink according to the invention, the following components were used (see table 1):

TABLE 1

| Composition of the ink | |
|---|---:|
| NAFION ® solution (3.3 wt. % in propylene glycol) | 151.5 g |
| Vulcan XC72 carbon black | 20.4 g |
| Pt-VTS solution (33.7% in methyl dodecanoate) | 33.8 g |
| Sodium hydroxide solution (15%) | 2.4 g |

The components were intimately blended and carefully homogenized.

EXAMPLE 2

To produce another membrane electrode assembly, the Pt-VTS produced in example 1 was processed to an ink with the following composition:

TABLE 2

| Composition of the ink | |
|---|---:|
| NAFION ® solution (3.75% in propylene glycol) | 181.1 g |
| Vulcan XC72 carbon black | 16.0 g |
| Pt-VTS (Pt content 18.1%) | 22.1 g |
| Sodium hydroxide solution (15%) | 4.1 g |

The two inks were printed onto NAFION® 115 membranes in the $Na^+$ form by the screen printing process and dried at 110° C. The reverse sides of the membranes were then coated with the catalyst ink in the same way. The reprotonation took place in 0.5 molar sulfuric acid. The membrane electrode assembly which was produced using the ink from example 1 had a total platinum load of only 0.26 mg/cm$^2$, whereas the second membrane electrode assembly possessed a total platinum load of 0.48 mg/cm$^2$.

In the finished membrane electrode assemblies according to the invention, no more silicon or silicon organic compounds could be found.

Figure 4:
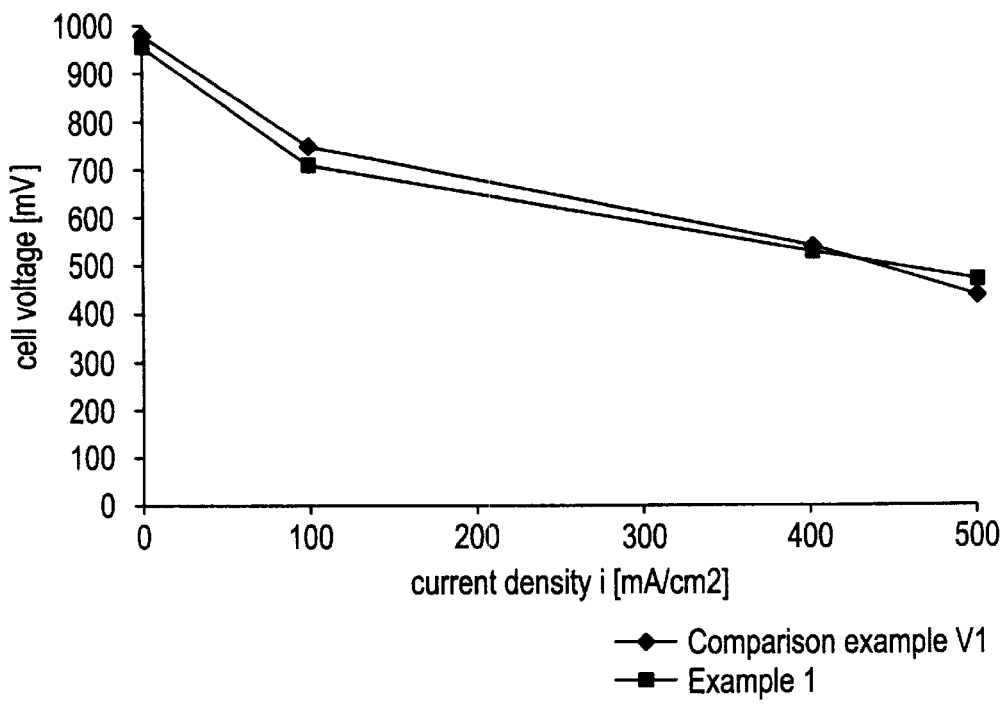
FIG. 4 is a graph of cell voltage as a function of current density in air operation for the MEA of example 1 and comparative example 1.
Figure 5:
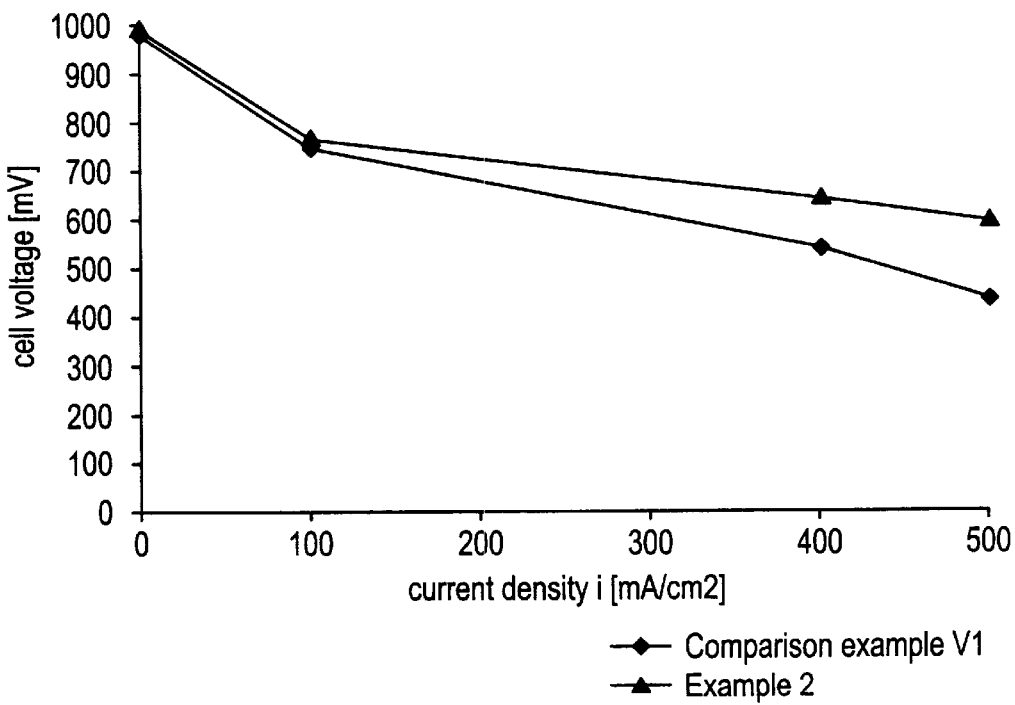
FIG. 5 is a graph of cell voltage as a function of current density in air operation for the MEA of example 2 and comparative example 1.

The measured cell voltages in air operation as a function of the current density are illustrated by way of an example in FIG. 4 for the cells of comparative example 1 and example 1 and in FIG. 5 for the cells of comparative example 1 and example 2. It can be seen that the membrane electrode assemblies according to the invention in accordance with example 1 provide approximately equally high power to VB1, despite a markedly reduced platinum load (only about 50%). Example 2 shows markedly improved electrical power compared with the prior art (VB1) for the same platinum load.

Both examples provide evidence of a clear increase in platinum utilization. This obviously is due to the specific properties of the forming of platinum crystallites in the catalyst layer according to the invention. The thermal destruction of the organic Pt(O) compound leads to an immediate forming of metallic platinum without the need to precipitate a platinum precursor compound and thereafter reducing it with reducing agents. Further, it is assumed that the pores of the catalyst layer are not wetted with the unpolar organic Pt(O) complex compound due to high concentrations of polar surface groups. This leads to a better accessibility of the catalyst particles for ionomer and reaction gases and thereby the number of three phase zones is increased.

The production of the supported catalyst in a separate step which is necessary according to the prior art is unnecessary in the membrane electrode assemblies according to the invention.

Table 3 shows the cell voltages measured when the cells were loaded with a current density of 500 mA/cm$^2$. The total loads of the respective membrane electrode assemblies with platinum are also given. These total loads are the sums of the platinum loads of the two catalyst layers.

TABLE 3

Cell voltages in air operation at 500 mA/cm$^2$

| Example | Platinum load [mg/cm$^2$] | Cell voltage [mV] |
| --- | --- | --- |
| Comparative example 1 | 0.5 | 436 |
| Example 1 | 0.26 | 470 |
| Example 2 | 0.48 | 598 |

Further variations and modifications of the foregoing will be apparent to those skilled in the art and are intended to be encompassed by the claims appended hereto.

German priority application 198 37 669.3 filed Aug. 20, 1998 is relied on and incorporated herein by reference.

We claim:

1. A catalyst layer on a substrate material which contains a proton-conducting polymer (ionomer), electrically conductive carbon particles and fine particles of at least one precious metal, produced by a process comprising:
   coating the substrate material with an ink which contains a dispersion of the carbon particles and at least one organic precious metal complex compound in a solution of the ionomer,
   drying the coating below a temperature at which the ionomer or the substrate material is thermally damaged, wherein the precious metals in the complex compounds are present with an oxidation number of 0 and the complex compounds are thermally decomposed during drying to form the fine precious metal particles.

2. The catalyst layer according to claim 1, wherein a solution of the organic precious metal complex compound in an organic solvent is used.

3. The catalyst layer according to claim 1, wherein the ionomer is a tetrafluoroethylene-fluorovinyl ether copolymer with sulfonic acid groups.

4. The catalyst layer according to claim 3, wherein at least one of the precious metals is selected from the group consisting of platinum, palladium, iridium, rhodium and ruthenium in the form of an organic precious metal complex compound.

5. The catalyst layer according to claim 4, wherein said complex is a Pt(0) complex compound which thermally decomposes at below 200° C.

6. The catalyst layer according to claim 5, wherein the Pt(0) complex compound is the reaction product of 1,3-divinyl-1,1,3,3-tetramethyldisiloxane with hexachloroplatinic acid.

7. The catalyst layer according to claim 1, wherein fine particle size carbon black, graphite or activated carbon is used as the electrically conductive carbon particles.

8. The catalyst layer according to claim 7, wherein the weight ratio of the carbon particles to the ionomer in the finished electrode is between 5:1 and 1:1.

9. The catalyst layer according to claim 8, wherein the layer has an area concentration of the precious metals of between 0.01 and 5 mg/cm$^2$.

10. The catalyst layer according to claim 9, wherein the weight ratio of the precious metals to the carbon particles is 1:10 to 4:1.

11. The catalyst layer according to claim 10, wherein the electrode has a layer thickness of between 1 and 100 μm.

12. The ink according to claim 10, wherein the weight ratio of the precious metals to the carbon particles is 1:10 to 4:1.

13. Ink for the production of the catalyst layer according to claim 1, which contains a proton-conducting polymer, electrically conductive carbon particles and fine particles of at least one precious metal,
   said ink comprising a dispersion of carbon particles and at least one organic precious metal complex compound in a solution, the precious metal in the complex compound being present with an oxidation number of 0 and the complex compound being thermally decomposable below a temperature at which thermal damage to the polymer sets in, to form the fine precious metal particles.

14. The ink according to claim 13 wherein said solution is a solution of the polymer.

15. The ink according to claim 14, wherein the ionomer is a tetrafluoroethylene-fluorovinyl ether copolymer with sulfonic acid groups.

16. The ink according to claim 13, wherein the solution of the organic precious metal complex compound is in an organic solvent.

17. The ink according to claim 16, wherein the Pt(0) complex compound is the reaction product of 1,3-divinyl-1,1,3,3-tetramethyldisiloxane with hexachloroplatinic acid.

18. The ink according to claim 13, at least one of the precious metals is selected from the group consisting of platinum, palladium, iridium, rhodium and ruthenium in the form of an organic precious metal complex compound.

19. The ink according to claim 18, wherein said organic precious metal complex compound Pt(0) complex compound which thermally decomposes at below 200° C.

20. The ink according to claim 13, wherein fine particle size carbon black, graphite or activated carbon is used as the electrically conductive carbon particles.

21. The ink according to claim 20, the weight ratio of the carbon particles to the ionomer is between 5:1 and 1:1.

22. A membrane catalyst assembly of a polymer electrolyte membrane and catalyst layers applied on both sides, wherein the catalyst layer is an ink according to claim 13.

23. Membrane electrode assembly of a polymer electrolyte membrane and catalyst layers with gas diffusion structures applied on both sides, wherein said catalyst layer is an ink according to claim 13.

24. A gas diffusion electrode for a polymer electrolyte fuel cell, comprising
- a gas diffusion structure as a substrate material having deposited thereon a catalyst layer according claim 1.

25. A process for the production of a catalyst layer on a substrate material, which contains a proton-conducting polymer, electrically conductive carbon particles and fine particles of at least one precious metal, comprising:
- coating the substrate material with an ink which contains a dispersion of the carbon particles and at least one organic precious metal complex compound in a solution of the polymer,
- drying the coating below a temperature at which the polymer or the substrate material is thermally damaged,
- the precious metals in the complex compounds being present with an oxidation number of 0 and the complex compounds being thermally decomposed during drying to form the fine precious metal particles.

26. Process according to claim 25, wherein a solution of the organic precious metal complex compounds in an organic solvent is used.

* * * * *